INVENTOR.
ALEXIS A. VENGHIATTIS
BY
E. F. Bard
ATTORNEY

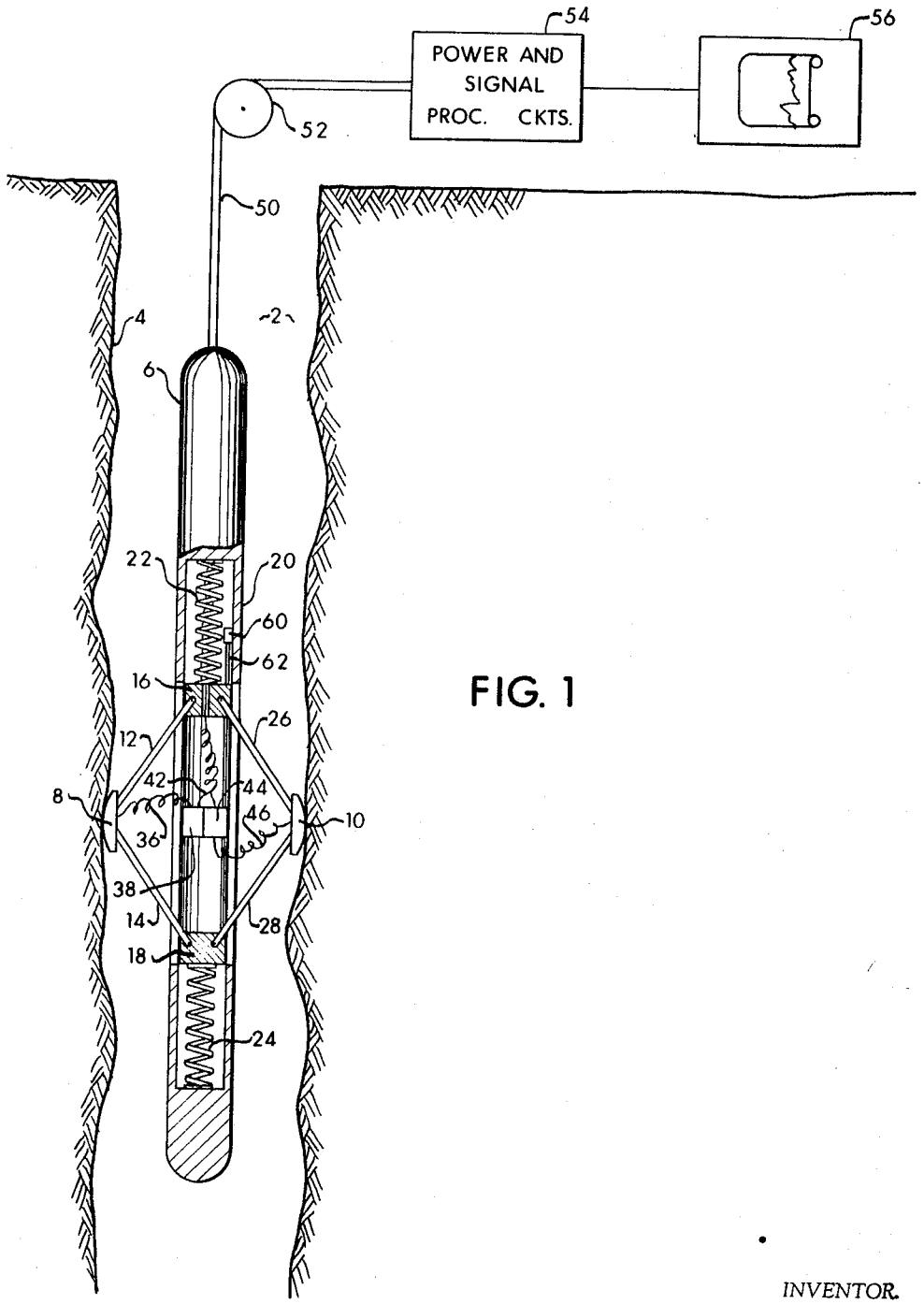

United States Patent Office 3,363,719
Patented Jan. 16, 1968

3,363,719
ACOUSTIC VELOCITY LOGGING METHOD AND APPARATUS HAVING LATERAL AND LONGITUDINAL RECEIVERS
Alexis A. Venghiattis, Weston, Conn., assignor to Dresser Industries, Inc., Dallas, Tex., a corporation of Delaware
Filed Dec. 23, 1965, Ser. No. 515,858
11 Claims. (Cl. 181—.5)

ABSTRACT OF THE DISCLOSURE

A first receiver is positioned laterally from the acoustic transmitter in a borehole for measuring the velocity of the acoustic shear wave and a second receiver is positioned longitudinally from the transmitter for measuring the velocity of the acoustic compressional wave.

---

This invention relates to the art of well logging to investigate the character of earth substances surrounding a borehole, and more particularly relates to methods and apparatus for measuring the velocity of acoustic energy traveling in such substances.

It is well known in the oil and gas industry that acoustic velocity measuring techniques can often provide an accurate indication of the porosity of a subsurface earth formation, and that the porosity of any formation is a significant factor in determining whether or not the formation contains oil. However, like all other well logging techniques now in use, all conventional acoustic velocity measurements are subject to many factors which adversely affect their accuracy.

The conventional acoustic velocity logging measurement is performed by passing a spaced-apart array of two or more transducers longitudinally through the borehole, while periodically causing one of these transducers to emit a "pulse" or burst of acoustic energy. The other transducers are adapted to detect and to convert this acoustic energy into an electric signal, and thus the acoustic velocity measurement is obtained by measuring the time interval subsisting between the actuation of the transmitting transducer and the receipt or detection of the generated acoustic pulse at an adjacent receiving transducer. Alternatively, the time interval between the receipt of the same acoustic pulse by two spaced-apart receivers may be measured. The distance between the two transducers is, of course, preselected in order to provide a basis for determining velocity.

It will be apparent that the acoustic pulse must first travel laterally across the borehole before it can enter the adjacent earth. Furthermore, it must travel back across the borehole to the receiver after reaching the point in the earth adjacent the receiver, before it can be detected. Acoustic well logging is necessarily an "open hole" technique, which means it can only be performed in an uncased borehole. Since the walls of uncased boreholes are inherently irregular, the "stand-off" distances between the borehole wall and the transducers will necessarily vary radically throughout the length of the borehole. Thus, variations in the diameter and cross sectional shape of the borehole, will necessarily adversely affect the accuracy of any measurement which is presumed to be based only on the travel time of the acoustic pulse between the two points in the *earth* which are adjacent the two transducers.

It will also be apparent that if the velocity to be measured is the travel time through the distance (in the earth) between two transducers, the wider the spacing the more likely that this distance will occasionally overlap two formations with different porosity. In this event, the measured velocity will be an *average*, only, and will thus not provide an accurate indication of the actual porosity of the adjacent earth. Accordingly, it has been sought to obtain as small a spacing as possible between the two measuring transducers, in order to provide as sharp an indication as possible of abrupt changes in earth porosity.

However, it will be apparent that when the acoustic energy pulse is generated, it will travel through the tool and the fluid contents of the borehole, as well as through the adjacent earth. Accordingly, then, the transducers cannot be spaced so closely that the acoustic energy will reach the spaced-apart receiving transducer, via the tool or the borehole fluid, before it reaches the receiver through the adjacent earth. Many techniques have been developed and tried for the purpose of delaying the transmission of acoustic energy through the tool or the borehole fluid. However, it is still necessary to space the two transducers at least one foot apart in every case, and at least 3 feet apart in many cases.

Another aspect of commercial acoustic velocity well logging measurements is that the acoustic energy arrives at each receiving transducer in the form of a complex wave train, notwithstanding the fact that the transmitting transducer generates the acoustic energy in the form of a sharp pulse. The reasons for this transformation are not entirely agreed upon, by those skilled in this art. However, it is generally recognized that each wave train so produced will include a shear wave as well as the dilatational or compressional wave.

As hereinbefore stated, it is conventional to generate an acoustic pulse, and thereafter to measure the time required for the acoustic energy to be detected at two spaced-apart receiving transducers. It will be apparent then, that in order for this technique to provide an accurate measurement of the travel time of the acoustic energy or wave train, it is essential that the time between the two detections be measured with respect to the same point on the acoustic wave train.

Conventional acoustic velocity logging systems are intended to measure the travel time of the compressional wave. However, it is believed that the measurements often vary, in a random manner, between the compressional wave and the shear wave. Inasmuch as the shear wave is approximately 15% slower than the compressional wave, it will be seen that this can introduce serious error into any measurement which is presumed to be based only on the travel time of the acoustic compressional wave in the surrounding earth.

These disadvantages of the prior art are overcome with the present invention, and novel methods and apparatus are provided herein for measuring only the velocity of the acoustic shear wave in a very narrow vertical section of the earth substances traversed by a borehole.

Accordingly, it is an object of the present invention to provide novel acoustic velocity logging methods and apparatus for measuring the porosity of very thin vertical segments of the earth surrounding a borehole.

It is also an object of the present invention to provide novel acoustic velocity logging methods and apparatus for measuring only the travel time of the acoustic pulse in the earth and to thereby eliminate inaccuracies due to tool stand-off in the borehole.

It is a further object of the present invention to provide novel acoustic velocity logging methods and apparatus for simultaneously measuring the velocities of both the compressional wave and the shear wave in an earth formation traversed by a borehole.

It is a specific object of the prevent invention to provide a novel method of acoustic velocity well logging comprising the steps of providing an acoustic energy signal at a first point in the wall of a borehole traversing a subsurface earth formation, detecting at least a portion of said acoustic energy signal at a second point in the wall of said borehole spaced substantially laterally from said first point in said borehole, and measuring the time interval required for said portion of said acoustic energy signal to travel around said borehole through said formation between said first and second points.

It is also a specific object of the present invention to provide novel apparatus for measuring the velocity of acoustic energy in a subsurface earth formation, said apparatus comprising an elongated well logging instrument adapted to be longitudinally inserted in a borehole in said earth formation, centralizing means for centralizing said instrument in said borehole, a first acoustic energy transducer disposed on said centralizing means to be urged against a first point in the wall of said borehole, a second acoustic energy transducer disposed on said centralizing means to be urged against a second point in the wall of said borehole, said first and second points being generally laterally spaced apart at a lateral angle relative to the longitudinal axis of said instrument, means for providing an acoustic energy signal at said first point in said borehole wall and for rendering said second transducer responsive to at least a portion of said acoustic energy signal at said second point in said borehole wall, and means for measuring the time interval required for said portion of said acoustic energy to travel in said formation and around said borehole between said first and second points in said borehole wall.

The advantages of the present invention are preferably attained by utilizing conventional acoustic logging equipment wherein the transmitting and receiving transducer are each mounted at the apex of two bowsprings or equivalent mounting arms which, in turn, are mounted 180 degrees radially apart on the logging tool. Thus, the acoustic pulse will travel around the borehole between the two transducers, instead of up or down a portion of the length of the borehole, and will provide a velocity measurement which involves a vertical "slice" of the earth which is no thicker than the thickness of the receiving transducer. The bowsprings, of course, function to urge the transducers directly against the wall of the borehole at all times. Thus, there will be no tool stand-off error in the measurement irrespective of variations in borehole diameter of cross sectional shape.

It will be clear, however, that if the diameter or cross sectional shape of the borehole changes as the tool moves up, the arcuate distance through the earth, and between the two transducers will also change accordingly. These changes in the distance between the transducers must obviously be noted and compensated for in the recorded velocity measurement, and this may be done by providing a compensating measurement of borehole diameter or cross section in correlation with the velocity measurements obtained. The bowsprings themselves may be used to provide such a diameter measurement, or separate caliper equipment may be provided.

These and other objects and features of the present invention will be apparent from the following detailed description, wherein reference is made to the accompanying drawings. In the drawings:

FIGURE 1 is a pictorial representation in cross section of one form of the apparatus of the present invention disposed in a typical borehole.

Figure 3A:
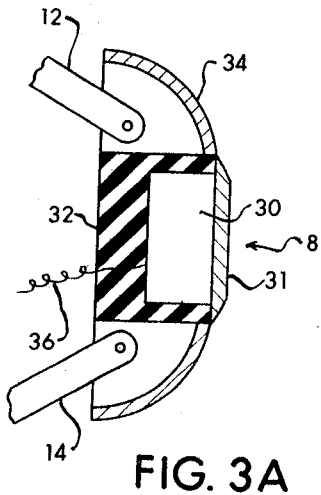
FIGURE 3A is a cross sectional view of the apex of one of the bowsprings, including a cross sectional view of the transducer mounted thereon.

Referring now to FIGURE 1, there may be seen in cross sectional view a typical borehole 2 having an irregular wall 4. Suspended in the borehole 2 is an acoustic velocity well logging instrument 6 having a pair of pads 8 and 10 arranged and adapted to course or drag along the borehole wall 4 in substantially continuous contact therewith. Pad 8 may be seen to be pivotally mounted at the ends of two rigid arms 12 and 14, which are preferably of equal length, and which are pivotally mounted or connected to pistons 16 and 18, respectively. Pistons 16 and 18 may each be seen to be urged together, inside of the housing 20 of the instrument 6, by springs 22 and 24. Thus, it will be apparent that springs 22 and 24 co-act to keep pad 8 urged outwardly against the borehole wall 4.

Pad 10 may be seen to be similarly mounted on the ends of arms 26 and 28, which are preferably equal in length to arms 12 and 14, and which are also pivotally connected to pistons 16 and 18, respectively Accordingly, springs 22 and 24 may be seen to urge pad 10 also against the face of the borehole wall 4. Pads 8 and 10 are preferably located equidistantly from the same point on the longitudinal axis of the instrument 6, and 180 degrees about the instrument 6 from each other. Thus, it will be apparent that pads 8 and 10 will always contact substantially the same vertical section or "slice" of the surrounding earth substances, assuming that the instrument 6 and borehole 2 do not tilt significantly from vertical. Furthermore, if the lengths of arms 12, 14, 26, and 28 are properly chosen with respect to the maximum effective diameter of the borehole 2, both pads 8 and 10 will be in continuous contact with the borehole wall 4 at all times while the instrument 6 is in the borehole 2.

Figure 3B:
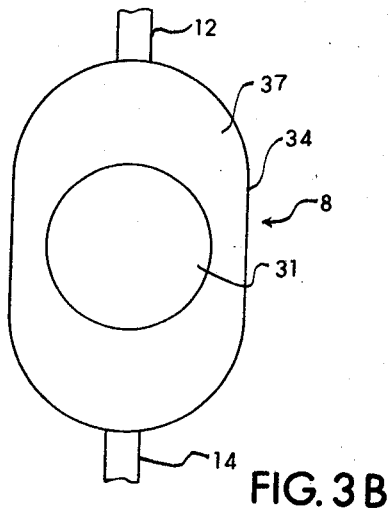
FIGURE 3B is a pictorial view of the face of the transducer depicted in FIGURE 3A which is continually urged against the borehole wall during logging operations.

Referring now to FIGURES 3A and 3B, there may be seen a generalized view of the details of apparatus suitable for use as pad 8, and showing an acoustic energy transducer 30 imbedded in a protective cushion 32 of rubber or neoprene which, in turn, is mounted in a metal frame 34. As may be seen, the transducer 30 is preferably covered by a metal plate 31 so as to protrude slightly above the facing surface 37 of the frame 34. The frame 34 may also be seen to be pivotally mounted on the ends of the arms 12 and 14, so that the pad 8 is maintained in a substantially vertical position irrespective of variations in the diameter of the borehole 2.

The transducer 30 is a device for converting electrical energy into acoustic energy, if pad 8 is to contain the acoustic energy transmitter, or acoustic energy into electrical energy, if pad 8 is to contain the acoustic energy receiver. Thus, the transducer 30 may be a magnetostrictive transducer, a piezoelectric transducer, or any other suitable device which is capable of performing this function. There is required an electrical conductor 36 which functions to transmit electrical energy to or from the transducer 30, and this conductor 36 may be disposed in any suitable manner such as along or inside one of the arms 12 and 14 irrespective that the accompanying drawings show conductor 26 to be exposed.

As hereinbefore stated, pad 10 is identical to pad 8 in all respects, except that one of these two pads must contain a transmitting transducer, and the other must contain a receiving transmitter. For purposes of illustration only, it will hereinafter be assumed that pad 8 contains the receiving transducer, and thus transducer 30 will respond to incident acoustic waves in the adjacent earth by generating electrical waves substantially similar to the incident acoustic waves. These electrical waves generated by transducer 30 are relatively weak in amplitude, and thus conductor 36 serves to conduct these weak signals to amplifier 38, the output of which is applied to conductor circuitry 42 which extends through a suitable channel in piston 16 to other conventional processing circuitry, such as cable driving and impedance matching circuits, in the upper section of the instrument 6.

The transmitting transducer in pad 10 functions to generate an acoustic pulse in response to an electrical pulse produced by a suitable pulse generator 44, which electrical pulse is sent to pad 10 by way of conductor 46. The pulse generator 44 is powered and triggered at a preselected frequency by conventional circuitry in the upper section of the instrument 6, and the necessary power and trigger signals are also transmitted to the pulse generator 44 by way of the conductor circuitry 42 hereinbefore described.

As may be seen in FIGURE 1, the logging instrument 6 is suspended in the borehole 2 by means of a logging cable 50 which passes over a measuring sheave 52. This measuring sheave 52, in turn, may be suspended in any suitable manner over the mouth of the borehole 2, such as by a traveling block hanging from a conventional derrick. The logging cable 50 also contains one or more electrical conductors, and thus serves to transmit electrical power and information signals between the subsurface instrument 6 and conventional power and signal processing circuitry 54 at the surface. From there, the signals which represent acoustic travel time are applied to a conventional recorder 56 which provides, in correlation with borehole depth, a graphic representation of the velocity measurements obtained throughout the borehole 2. The depth correlation may be obtained in any conventional manner, such as by driving the recorder 56 in correlation with rotation of the measuring sheave 52.

Figure 2:
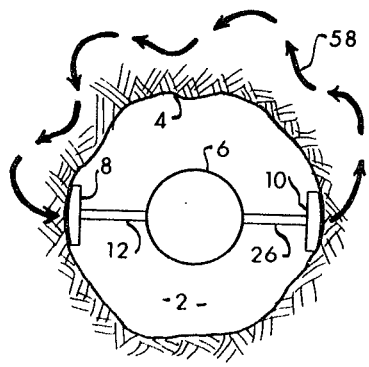
FIGURE 2 is a vertical cross sectional view of the apparatus and borehole depicted in FIGURE 1, showing the expected path of travel of the acoustic energy between the two delineating transducers.

Referring now to FIGURE 2, there may be seen a pictorial vertical view, partly in cross section, of the apparatus depicted in FIGURE 1. Accordingly, the instrument 6 is shown to be disposed in a generally centralized position in the borehole 2, by virtue of the positioning effect of arms 12, 14, 26 and 28, and pads 8 and 10. Also shown is the path 58, which the acoustic shear wave produced by the transducer in pad 10 takes in reaching the transducer 30 in pad 8. Although FIGURE 2 shows the path 58, of the acoustic shear wave to be in only one rotational direction about the borehole, it will be apparent to those skilled in this art that the shear wave will also travel a similar but opposite path from pad 10 to pad 8. However, this correlated but opposite path has been omitted in FIGURE 2, for the purpose of simplicity.

It will be apparent that, with the co-planar arrangement of pads 8 and 10, nothing but the shear wave can be received by pad 8, and that this will eliminate the error produced in conventional systems, wherein the measurement varies in a random manner between shear and shock wave velocity. It will be further evident, as suggested in FIGURE 2, that path 58 will not be clearly defined. However, the variations in the shape of path 58 will be largely due to the particular type of earth material in which the shear wave is traveling, and can be determined by calibration.

It is also apparent that the length of path 58 depends and is a function of the diametrical space between pads 8 and 10. Thus, the time measurements obtained must be corrected for diametrical variations, by adjusting such time measurements with respect to correlative diametrical measurements. As hereinbefore stated, the position of the pads 8 and 10, with respect to each other, will provide a correlative measurement of the diameter of the borehole 2 at all times, and this may be obtained in any number of conventional ways.

Referring again to FIGURE 1, there may be seen one suggested form of apparatus for providing a correlative diameter measurement, which apparatus includes a potentiometer 60 which is fixedly mounted on the inner surface of the housing 20, of the instrument 6, at a preselected distance above the upper piston 16. The potentiometer 60 is further arranged to be varied by a push rod 62 located to be positioned by piston 16. The push rod 62 is preferably spring-loaded so as to be continually urged against the upper surface of piston 16. Thus, when larger diameters are encountered in the borehole 2, and when springs 22 and 24 consequently push pistons 16 and 18 relatively closer together, the spring-loaded push rod 62 will accordingly follow piston 16 downward to cause the potentiometer to generate a voltage which is directly indicative of the wider spacing between pads 8 and 10. On the other hand, when smaller diameters are encountered the pads 8 and 10 will accordingly push the pistons 16 and 18 farther apart, and piston 16 will consequently drive the push rod 62 upwards to correlatively position the potentiometer 60. The output of the potentiometer 60 can be calibrated by any of several conventional techniques, to provide a voltage which is a direct indication of the diameter of the borehole 2, as measured between the two pads 8 and 10, and this output voltage may be sent to the surface by way of the logging cable 50.

Figure 4:
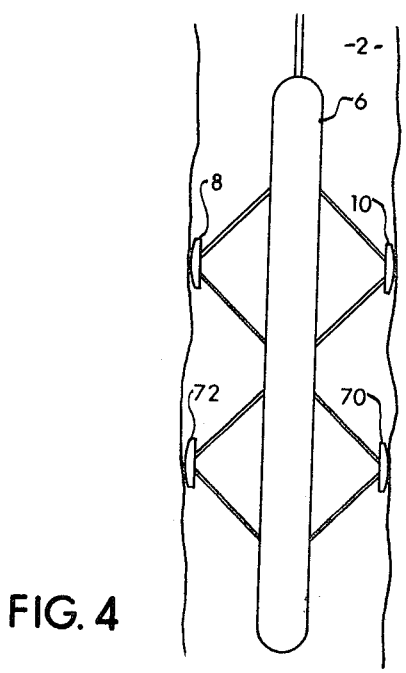
FIGURE 4 is a pictorial view, partly in cross section, of another embodiment of the apparatus depicted in FIGURE 1.

Referring now to FIGURE 4, there may be seen a simplified functional representation of the apparatus depicted in FIGURE 1, but which further includes an additional pair of bowspring arms supporting two additional pads 70 and 72. Pad 72 need not contain any transducer or other sensing or transmitting device, and functions only to assist in supporting the logging instrument 6 in substantial alignment with the axis of the borehole 2. However, pad 70 is preferably provided with another receiving transducer which functions to make an improved measurement of the travel time of the compressional wave traveling between pads 10 and 70. This arrangement will provide a greatly improved velocity measurement, however, because the measurement will obviously be immune to tool stand-off in the borehole 2. Furthermore, pads 10 and 70 can be spaced relatively closely together to provide a "thinner" measurement, since acoustic energy traveling through the instrument 6 must move from pad-to-pad by way of their supporting arms, and this will provide a relatively extended and time consuming route compared with travel merely through the body of a conventional logging tool.

In the apparatus depicted in FIGURE 4, there thus will be produced measurements of the velocities of both the shear wave and the compressional wave, in each acoustic energy pulse generated at pad 10. The combination of these two measurements will provide a basis for many useful interpretations of the earth formations surrounding a borehole 2. For example, it is well known that the velocity of the shear wave is based on the following equation or relationship:

$$Vs = \sqrt{\frac{\mu}{\rho}}$$

wherein $\mu$ represents the shear modulus of the adjacent earth, and wherein $\rho$ represents the density of the earth. Furthermore, it is well known that the velocity of the compressional wave is based on the following relationship:

$$Vc = \sqrt{\frac{E + 4/3\mu}{\rho}}$$

wherein E represents the bulk modulus of the earth substances in question. The following relationship:

$$\frac{Vs^2}{Vc^2} = \frac{E}{\mu} + 4/3$$

which is a simple linear function of the well known "Poisson's Ratio" of the adjacent rock, and which will therefore provide a measurement of a parameter which is of significant interest in subsurface earth investigation.

As hereinbefore stated, the co-planar arrangement of pads 8 and 10 should provide an effective measurement of only the shear wave, and in theory, the compressional wave should not travel circularly about the borehole 2. In the event that deflection of the compressional wave occurs, and the detection of the high velocity compressional wave at pad 8 actually occurs, this may be easily provided against by gating the amplifier 38 off for a suitable period following each actuation of the transducer in pad 10. Moreover, it should be remembered that the shear wave has a very high relative amplitude, especially as compared to the compressional wave, and the output signals from the amplifier 38 may be passed through a conventional amplitude discriminator having its trigger level set to "fire" only on receipt of signals of an amplitude greater than that of the compressional wave. This same means can obviously be used to exclude the "road noise" pulses or waves which will arise from scraping the pads along the borehole wall 4, since the shear wave will usually be found to have a higher amplitude than most of the "road noise" pulses generated by such scraping.

Although pads 8 and 10 have been shown in the drawings to be disposed 180 degrees apart, it is only necessary that they be arranged in a co-planar manner. In those cases wherein the character of the earth is such that the shear wave tends to be damped out, or is "drowned out" by road noise, the pads 8 and 10 may be rotated closer together, although it may also then be necessary to provide a third set of arms and pad, in order to maintain the instrument in its vertical position in the borehole. In this respect, it should be apparent that the present invention is far superior to the usual velocity system, since in conventional equipment the transducers must always be spaced at least a minimum distance apart to avoid having the acoustic signal reach the receiver, by way of the tool body or the borehole fluid, before the acoustic energy can reach the receiver through the adjacent earth. In the present invention, the spacing angle between pads 8 and 10 can be made very acute, since there is generally no "water wave" with respect to shear wave velocity measurements, and since the acoustic path through the instrument 6 is obviously not shortened by rotating the pads 8 and 10 angularly closer together. If pad 8 tends to pick up any of the compressional wave through the borehole fluid, this can be eliminated by conventional receiver circuit gating, as hereinbefore explained.

Numerous other variations and modifications may obviously be made without departing from the basic concepts of the present invention. Accordingly, it should be clearly understood that the forms of the invention described herein and depicted in the accompanying drawings are illustrative only and are not inteded to limit the scope of the invention.

What is claimed is:

1. Method of acoustic velocity well logging comprising the steps of
   providing an acoustic energy signal at a first point in the wall of a borehole traversing a subsurface earth formation,
   detecting at least a portion of said acoustic energy signal at a second point in the wall of said borehole spaced substantially laterally and 180° from said first point in said borehole, and
   measuring the time interval required for said portion of said acoustic energy signal to travel around said borehole through said formation between said first and second points.

2. The method described in claim 1, including the additional step of measuring the diameter of said borehole at one of said first and second points.

3. The method described in claim 2, including repeating said method at preselected depth intervals in said borehole, determining the velocity of said portion of said acoustic energy signal in said formation at each of said depth intervals, and graphically displaying said determinations of velocity in correlation with an indication of borehole depth.

4. Apparatus for measuring the velocity of acoustic energy in a subsurface earth formation, said apparatus comprising
   an elongated well logging instrument adapted to be longitudinally inserted in a borehole in said earth formation,
   centralizing means for centralizing said instrument in said borehole,
   a first acoustic energy transducer disposed on said centralizing means to be urged against a first point in the wall of said borehole,
   a second acoustic energy transducer disposed on said centralizing means to be urged against a second point in the wall of said borehole,
   said first and second points being generally laterally spaced apart at a lateral angle relative to the longitudinal axis of said instrument and at an angle of substantially 180° to each other,
   means for providing an acoustic energy signal at said first point in said borehole wall and for rendering said second transducer responsive to at least a portion of said acoustic energy signal at said second point in said borehole wall, and
   means for measuring the time interval required for said portion of said acoustic energy to travel in said formation and around said borehole between said first and second points in said borehole wall.

5. The apparatus described in claim 4, and further comprising means interconnected with said centralizing means for measuring the diameter of said borehole relative to one of said first and second points in said borehole wall.

6. The apparatus described in claim 5, including means interconnected with said first and second transducers for measuring the velocity of said portion of said acoustic energy signal, and means for deriving an indication of the depth in said borehole of said first and second points.

7. The apparatus described in claim 6, including means for generating acoustic energy in discrete bursts so as to provide said acoustic energy signal intermittently at said first point at substantially a preselected rate of occurrence, and means for moving said instrument progressively through said borehole.

8. A method of acoustic velocity well logging comprising the steps of providing an acoustic energy signal at a first point in the wall of a borehole traversing a subsurface earth formation, detecting at least a portion of said acoustic energy signal at a second point in the wall of said borehole spaced substantially laterally from said first point in said borehole, measuring the time interval required for said portion of said acoustic energy signal to travel around said borehole through said formation between said first and second points, detecting said acoustic energy at a third point in the wall of said borehole spaced longitudinally from said first point, measuring the time interval required for said detected acoustic energy to travel through said formation between said first and third points, measuring the diameter of said borehole at one of said first and second points, repeating said steps at preselected depth intervals in said borehole, determining the velocity of said portion of said acoustic energy signal in said formation at each of said depth intervals, and graphically displaying said determinations of velocity in correlation with an indication of borehole depth.

9. The method, according to claim 8, including the additional step of deriving relative to each depth interval a measurement which is a function of the velocity of said acoustic energy traveling between said first and third points and the velocity of said portion of said acoustic energy traveling between said first and second points.

10. Apparatus for measuring the velocity of acoustic energy in a subsurface earth formation, said apparatus comprising an elongated well logging instrument adapted to be longitudinally inserted in a borehole in said earth formation, centralizing means for centralizing said instrument in said borehole, a first acoustic energy transducer disposed on said centralizing means to be urged against a first point in the wall of said borehole, a second acoustic energy transducer disposed on said centralizing means to be urged against a second point in the wall of said borehole, said first and second points being generally laterally spaced apart at a lateral angle relative to the longitudinal axis of said instrument, a third transducer urged against a third point in the wall of said borehole and spaced longitudinally from said first point, means for providing an acoustic energy signal at said first point in said borehole wall and for rendering said second transducer responsive to at least a portion of said acoustic energy signal at said second point in said borehole wall, means for measuring the time interval required for said portion of said acoustic energy to travel in said formation and around said borehole between said first and second points in said borehole, means interconnected with said first and second transducers for measuring the velocity of said portion of said acoustic energy signal, means for measuring the time interval required for acoustic energy to travel through said formation between said first and third points, means interconnected with said first and third transducers for measuring the velocity of said portion of said acoustic energy signal, means interconnected with said centralizing means for measuring the diameter of said borehole relative to one of said first and second points in said borehole wall, means for deriving an indication of the depth in said borehole of said first and second points, means for generating acoustic energy in discrete bursts so as to provide said acoustic energy signal intermittently at said first point at substantially a preselected rate of occurrence, and means for moving said instrument progressively through said borehole.

11. The apparatus according to claim 10, including means for deriving an indication which is functionally related to the velocity of said portion of said acoustic energy signal traveling between said first and second points and the velocity of acoustic energy traveling in said formation between said first and third points.

References Cited
UNITED STATES PATENTS

| | | | |
|---|---|---|---|
| 2,768,701 | 10/1956 | Summers | 181—.5 |
| 2,889,001 | 6/1959 | Ely et al. | 181—.5 |
| 2,943,694 | 7/1960 | Goodman | 181—.5 |

BENJAMIN A. BORCHELT, *Primary Examiner.*

R. M. SKOLNIK, *Assistant Examiner.*